(12) United States Patent
Trang et al.

(10) Patent No.: US 10,716,034 B2
(45) Date of Patent: Jul. 14, 2020

(54) METHOD AND SERVER FOR CONTROLLING RELOCATION OF A MEC APPLICATION

(71) Applicant: SONY MOBILE COMMUNICATIONS INC., Tokyo (JP)

(72) Inventors: Linh Trang, Åkarp (SE); Svante Alnås, Lund (SE); Anders Isberg, Åkarp (SE); Jim Rasmusson, Vellinge (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/078,517

(22) PCT Filed: May 10, 2017

(86) PCT No.: PCT/EP2017/061212
§ 371 (c)(1),
(2) Date: Aug. 21, 2018

(87) PCT Pub. No.: WO2017/194619
PCT Pub. Date: Nov. 16, 2017

(65) Prior Publication Data
US 2019/0053108 A1    Feb. 14, 2019

(30) Foreign Application Priority Data

May 10, 2016   (EP) .................................... 16169043

(51) Int. Cl.
*H04W 36/00*    (2009.01)
*H04L 29/08*    (2006.01)

(52) U.S. Cl.
CPC ..... *H04W 36/0033* (2013.01); *H04L 67/1012* (2013.01); *H04L 67/1025* (2013.01);
(Continued)

(58) Field of Classification Search
CPC ........... H04W 36/0033; H04L 67/2814; H04L 67/148; H04L 67/1025; H04L 67/1012; H04L 67/1021
(Continued)

(56) References Cited

U.S. PATENT DOCUMENTS

2008/0159232 A1*   7/2008   Thalanany ........ H04W 36/0016
                                                             370/332
2008/0207322 A1*   8/2008   Mizrahi .................. A63F 13/12
                                                             463/32
(Continued)

FOREIGN PATENT DOCUMENTS

KR    10-2014-0014300       2/2014
WO       2012167168 A2      12/2012

OTHER PUBLICATIONS

International Search Report from corresponding International Patent Application No. PCT/EP2017/061212, dated Jul. 18, 2017.
(Continued)

*Primary Examiner* — Khoi H Tran
*Assistant Examiner* — B M M Hannan
(74) *Attorney, Agent, or Firm* — Tucker Ellis LLP

(57) ABSTRACT

A method for controlling relocation of a session of an application hosted in a first server (220) connected to a radio station (301) configured for communication with wireless devices (303), comprising the steps of running (51) a session of the application between an application host in said server and an application client in a first wireless device; obtaining (53) context data in the server, which context data is related to the first wireless device during said session; providing (55) said context data to a management entity configured to control relocation of said session from the first server to a second server.

13 Claims, 3 Drawing Sheets

(52) U.S. Cl.
CPC ........ *H04L 67/148* (2013.01); *H04L 67/2814* (2013.01); *H04L 67/1021* (2013.01)

(58) Field of Classification Search
USPC .......................................................... 455/436
See application file for complete search history.

(56) References Cited

U.S. PATENT DOCUMENTS

| | | | | |
|---|---|---|---|---|
| 2009/0215540 | A1* | 8/2009 | Perlman | A63F 13/12 463/42 |
| 2010/0167809 | A1* | 7/2010 | Perlman | A63F 13/12 463/24 |
| 2015/0375113 | A1* | 12/2015 | Justice | A63F 13/355 463/42 |
| 2017/0164231 | A1* | 6/2017 | Quan | H04W 28/04 |
| 2019/0224577 | A1* | 7/2019 | van der Laan | A63F 13/12 |

OTHER PUBLICATIONS

"Mobile Edge Computing (MEC); Framework and Reference Architecture," ETSI GS MEC 003 v1.1.1, Mar. 31, 2016, 18 pages.
Huawei Technologoes France, "Use Case: Gaming and Low Latency Cloud Applications," MEC(15)000035r2, ETSI, Mar. 19, 2015, 3 pages.
Hede, Patrice; Huawei Technologies; Mobility, Provisioning and User Instantiation; MEC(15)000206; Oct. 11, 2015; 20 Pgs.
Fontes, Francisco: Altice Labs; May 5, 2015 MEC Mobility Scenarios; MEC(16)000219; 12 pgs.
Giust, Fabio: NEC Europe Ltd.; Jul. 14, 2015; MEC Mobility Management; 11 Pgs.
Hede, Patrice; Huawei Technologies France; Removing Latency Example Value; Jul. 1, 2015; 2 pgs. MEC(15)000156.

* cited by examiner

METHOD AND SERVER FOR CONTROLLING RELOCATION OF A MEC APPLICATION

TECHNICAL FIELD

The invention and its embodiments are related to systems and methods for providing edge computing power in connection with a radio station, whereby computing power is made available to radio devices operating in communication with the radio station. More specifically, the invention relates to a method for controlling relocation of a session of an application hosted in a first server connected to a radio station, to another server connected to another radio station.

BACKGROUND

The development of cloud-based services, operating to assist mobile devices with network-assisted storage and computing, is heavily increasing. Currently, ETSI (European Telecommunications Standards Institute) is promoting a new technology denoted Mobile Edge Computing (MEC), which is being standardized in an ETSI Industry Specification Group (ISG) of the same name. Mobile Edge Computing was originally developed to provide an IT service environment and cloud-computing capabilities at the edge of the mobile network, within the Radio Access Network (RAN) and in close proximity to mobile subscribers. The aim is to reduce latency, ensure highly efficient network operation and service delivery, and offer an improved user experience. In the second phase of ETSI MEC ISG this is replaced by the term Multi-access Edge Computing, which also includes other types of access besides cellular, e.g. wifi and fixed networks. In this document, reference will therefore be made to the abbreviated term ME or ME computing, going forward.

ME computing is thought of as a natural development in the evolution of mobile radio stations and the convergence of IT and telecommunications networking. ME computing is based on a virtualized platform, and will enable applications and services to be hosted 'on top' of mobile network elements, i.e. above the network layer. These applications and services can benefit from being in close proximity to the customer and from receiving local radio-network contextual information. The environment of ME computing is characterized by low latency, proximity, high bandwidth, and real-time insight into radio network information and location awareness, accomplished with ME servers hosting operator or 3rd party applications. As such, ME computing may enable new vertical business segments and services for consumers and enterprise customers. Frequently discussed use cases include video analytics, location services, Internet-of-Things (IoT), augmented reality, optimized local content distribution, data caching, mobile gaming, connected and controlled vehicle services etc. ME computing will allow software applications to tap into local content and real-time information about local-access network conditions. By deploying various services and caching content at the network edge, mobile core networks are alleviated of further congestion and can efficiently serve local purposes.

SUMMARY

The allocation of computing and data storage resources at the mobile edge may have implications for users of the offered services, when user mobility is taken into consideration. Solutions are provided herein aiming at alleviating mobility-related problems for mobile edge operation.

In accordance with a first aspect, a method is provided for controlling relocation of a session of an application hosted in a first server connected to a radio station configured for communication with wireless devices, comprising the steps of running a session of the application between an application host in said server and an application client in a first wireless device;

obtaining context data in the server, which context data is related to the first wireless device during said session;

providing said context data to a management entity configured to control relocation of said session from the first server to a second server.

In one embodiment, the method comprises the step of receiving relocation information related to the context data.

In one embodiment, the method comprises the steps of providing context data to the management entity related to a second wireless device running said application;

relocating the session dependent on a common latency requirement for said first and second wireless devices.

In one embodiment, the method comprises the step of relocating the session dependent on determining that a resulting latency will not exceed a predetermined level.

In one embodiment, the method comprises the step of providing relocation information to the wireless device, wherein said context data relates to client suitability of executing a relocation.

In one embodiment, said context data includes timing data associated with a level of latency sensitivity of the application session.

In one embodiment, said timing data identifies a time period associated with low level latency sensitivity.

In one embodiment, said timing data identifies a time delay.

In one embodiment, said first server is a ME server and said management entity includes a ME orchestrator, a ME platform or a ME platform manager.

In one embodiment, said context data is provided onto an interface from the ME server to the management entity.

In accordance with a second aspect, a server is provided, comprising an application host, which server is connectable to a radio station configured for communication with wireless devices and comprises processing means, memory storage, and computer program code for execution by the processing means to run a session of an application between the application host and an application client in a first wireless;

obtain context data related to the first wireless device during said session;

provide said context data onto an interface to a management entity configured to control relocation of said session from the first server to a second server.

In one embodiment, said context data is related to the application session, and includes data received from the application client.

In one embodiment, the server comprises computer program code for execution by the processing means to provide context data to the management entity related to a second wireless device running said application;

relocate the session dependent on a common latency requirement for said first and second wireless devices.

In one embodiment, said context data includes timing data associated with a level of latency sensitivity of the application session.

In one embodiment, said first server is a ME server and said management entity includes a ME orchestrator, a ME platform or a ME platform manager.

BRIEF DESCRIPTION OF THE DRAWINGS

Various embodiments will be outlined below with reference to the drawings, on which

DESCRIPTION OF EMBODIMENTS

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 1:
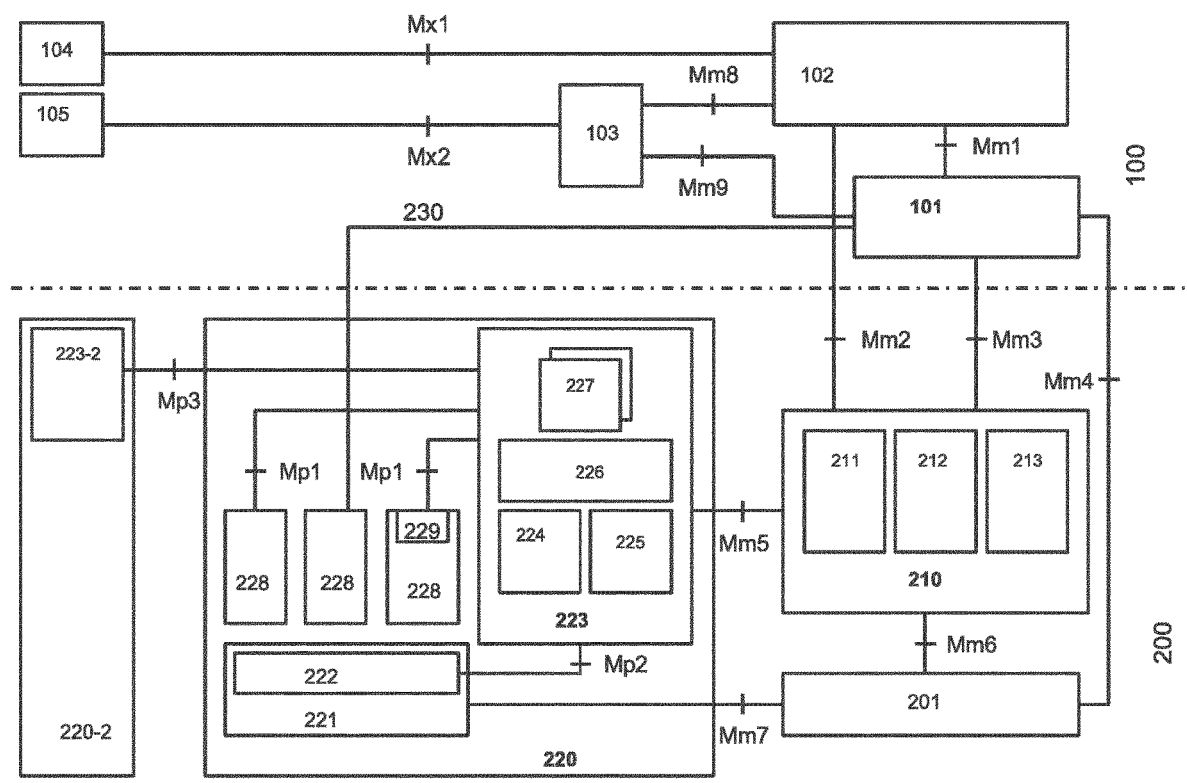
FIG. 1 illustrates a ME system reference architecture configured according to an embodiment.

FIG. 1 illustrates a ME system reference architecture configured according to an embodiment, showing functional elements that comprise the ME system, and the reference points between them. There are three groups of reference points defined between the system entities:

reference points regarding ME platform functionality (Mp);

management reference points (Mm); and reference points connecting to external entities (Mx).

In accordance with some embodiments, a ME system may be divided into a ME system level 100 and a ME host level 200. The system may comprise one or more ME servers 220, 220-2 etc., and ME management necessary to run ME applications within an operator network or a subset of an operator network.

The ME server 220 may be an entity that contains a ME platform and a virtualization infrastructure 221 which provides compute, storage, and network resources, for the purpose of running ME applications 228.

The ME server 220 may comprise a ME platform 223, which is a collection of essential functionality required to run ME applications 228 on a particular virtualization infrastructure and enable them to provide and consume ME services. The ME platform 223 may also provide services. Mobile edge applications 228 are instantiated on the virtualization infrastructure of the ME server 220 based on configuration or requests validated by ME management. The ME management may comprise ME system level management and ME host level management. The ME system level management includes a ME orchestrator 101 as a core component, which is configured to have an overview of the complete ME system. The ME host level management comprises a ME platform manager 210 and a virtualization infrastructure manager 201, and is configured to handle management of ME specific functionality of a particular ME server 220, and the applications 228 running on it.

Figure 2:
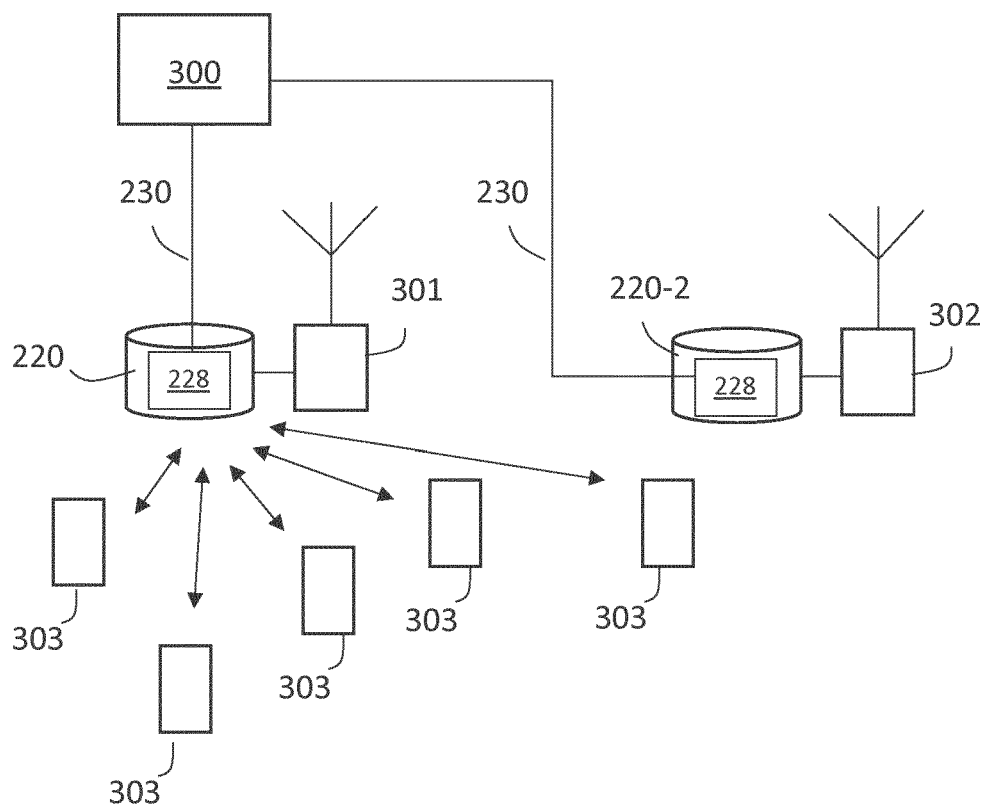
FIG. 2 illustrates a scenario of mobile devices supported by a ME system according to an embodiment.
Figure 3:
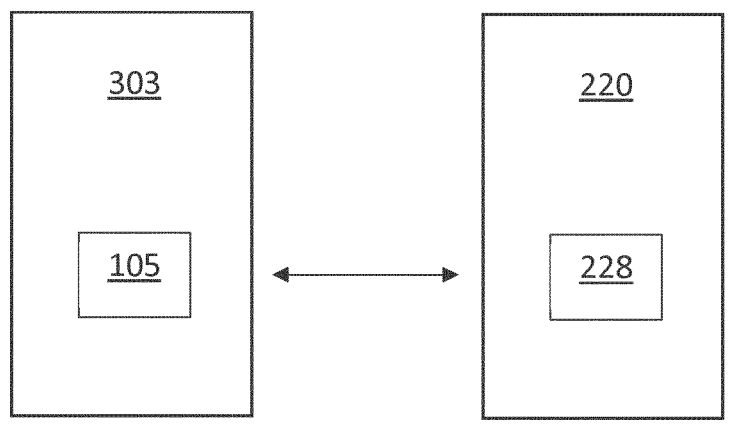
FIG. 3 schematically illustrates the running of an application session between a ME client in a wireless device and a host in a ME server.

FIG. 2 schematically illustrates a various wireless devices 303 operating as wireless device 303 in a radio communications network comprising radio stations 301, 302. The radio communications network may e.g. be a 3GPP LTE network, in which the radio stations 301, 302 are denoted eNodeB, and the wireless device may be referred to as user equipment UE 303. In an alternative embodiment, the radio communications network may e.g. be a wifi system, such as according to IEEE 802.11. The radio stations 301, 302 may in such a system be denoted access points, and are typically not arranged in a cellular arrangement. A first server 220 configured to operate as a ME server is connected to a first radio station 301, and a second server 220-2 configured to operate as a ME server is connected to a second radio station 302. A ME management entity 300 may be configured to control relocation of an application session from the first ME server 220 to the second ME server 220-2. With reference to FIG. 1, the management entity 300 may e.g. comprise a ME orchestrator 101, and/or a ME platform manager 210, and/or a ME platform 223 in various embodiments. An interface 230 is schematically indicated between the ME application 228 and the management entity 300. This interface may be employed for providing context, obtained in the server 220, to the management entity 300, which is configured to control relocation of an application session from the first server 220 to a second server 220-2. FIG. 3 very schematically illustrates one wireless device 303 comprising an application client 105 and a ME server 220 comprising an application host 228. Any of the wireless devices 303 of FIG. 2 may be part of an application session, running between an application host 228 in the server 220 and an application client 105 in a wireless device 303.

Due to e.g. user mobility, the ME system may detect that the current ME server 220 hosting an application, such as a game session or a service, is not optimal for a user, such as a wireless device or wireless device 303 involved in the application session. The ME system may thus decide to relocate hosting of a session of the application to a new ME server that may be more optimal, in terms of e.g. geographical location, load balancing, latency constrains etc., based on the current and past location of the wireless device 303. To ensure that latency requirements are met, e.g. that the latency remains low, it is here proposed to impose a context-determined relocation procedure between ME servers 220, 220-2, to guarantee low latency between ME server 220, 220-2 and wireless device 303. The proposed solution is to let the ME application provide a management entity 300 of the ME system with context data, which may include data related to the wireless device 303 and/or related to the application of the running session. Obtained context data is provided to assist the management entity 300 of the MEC system in optimizing user session relocation, e.g. due to UE mobility. The management entity may include e.g. the orchestrator 101, the OSS 102, and potentially also the ME platform manager 210, of the ME system, and may be configured to control relocation of an application session for a wireless device 303 from a first ME server 220 to a second ME server 220-2. In FIG. 1, the interface 230 is schematically included between the ME application 228 and the ME orchestrator 101 for this information exchange of context data, but this is merely one example of the configuration of the management entity 300, as mentioned. The management entity 300 may further be configured to provide relocation information for reception in at least the current ME server 220, which relocation information is related to and preferably optimized with respect to the context data.

Context data, which may be application related and/or UE related, is thus proposed here to be used to optimize the user session relocation to another ME server. This context data may be obtained in the ME server 220, where it is provided by either the client application 105 or the host application 228 or both. In one embodiment, context data may be application related. For a certain application, it may be known by being pre-configured, or otherwise foreseeable upon running the application, that different time periods of running the application may be associated with different levels of latency sensitivity. For example, a first period may be associated with a comparatively high level of latency sensitivity, and a second period may be associated with a comparatively low level of latency sensitivity. This may e.g. be the situation where the ME application is a game or a real time virtual reality application. When a user or player executes the application with a high degree of computational load, the application session may be latency sensitive. Should a relocation be executed at such a point in time, the user or player could experience glitches, dropped frames, application freeze periods, input lags, etc. At other instances of such a game or application, the rendered graphics may be substantially the same for a certain period of time. This may e.g. be the case if a controlled object or avatar in the game is still, or between different levels or stages of a computer game. In such a period, the application may be associated with a comparatively low latency sensitivity level. An example of context data may thus be a temporal stage of the application. Another example of context data may be a degree of graphic rendering in a wireless device 303 involved in the application session.

In various embodiments, context data may include server allocation information for two or more wireless devices 303, associated with a common application session. In such an embodiment, a management entity may be configured to control relocation of said session by postponement or inhibition of relocation of any of said two or more wireless devices 303. In another embodiment, the management entity may be configured to control relocation of said session by timing relocation of any one or all of said two or more wireless devices 303, responsive to an indication of suitability of executing a relocation for one of said two or more wireless devices. For instance, if it is determined that one of a plurality of wireless devices 303 associated with a common application session requires or would at least benefit from relocation from a first server to another server, the appropriateness or need for relocating any of the other wireless devices 303 is also assessed. In one embodiment, during a high latency sensitive period. In one embodiment, context data may include timing data associated with a level of latency sensitivity of the application session for one or more, or all, of said two or more wireless devices 303. In one embodiment, the context data may include timing data of a time window, within which it is suitable to relocate a first wireless device 303, and the management entity may thus be configured to relocate two or more of the wireless devices 303 associated with the same application session within the same time window. Context data may be obtained in the ME server 220, e.g. from the application host 228, or e.g. from the application client 105 of a wireless device 303 involved in an application session. With reference to various examples given herein, the context data may e.g. include a specific or relative latency sensitivity level, timing information associated with a suitability for relocation, e.g. related to latency sensitivity, information related to a plurality of wireless devices associated with a common application session, etc.

Figure 4:
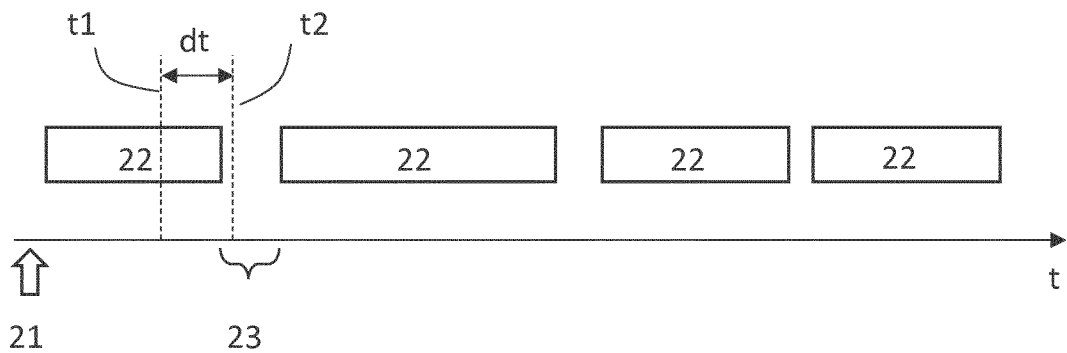
FIG. 4 illustrates a schematic relocation time diagram according to an embodiment.

Reference will now be made to FIG. 4, which schematically illustrates a scenario of a running application session, during which a session relocation is initiated by the ME system according to one embodiment. In this embodiment, the context data includes time related information, related to when in time a running ME application is more latency sensitive and e.g. which period in time it is not, or less, latency sensitive. As used herein, a level of latency sensitivity may be determined high if it exceeds a predetermined level, and low if it does not exceed a certain level. Such levels may be configured dependent on various parameters, such as expected performance of wireless devices 303.

With reference to the drawing of FIG. 4, an application session may be initiated at 21. The application session may then progress with various degrees of latency sensitivity. As an example, the application may be a computer game, running in the server 220, operated by a user by means of an application client 105 in a wireless device 303. While running the game, in various periods of time 22 a lot of graphics data may be changing every timeframe. During such time periods 22 the application is associated with a comparatively high latency sensitivity, e.g. in the sense that there is a risk for glitches in the rendered graphics flow on the user's device 303 if the application session is relocated during such a time period 22. On the other hand, the application may be configured with intermediate periods of time 23, during which the latency sensitivity is comparatively low. This may e.g. relate to periods of time 23 when there is little or no movement in a video presentation on a screen of the device 303, e.g. when a user-controlled object or character is standing still in the game. Such periods 23 may thus be more suitable for relocation of the application session from one server 220 to another 220-2, since the risk for visible rendering glitches is much smaller.

In various embodiments, such as the one relating to a game application of FIG. 4, the context data may thus relate to client suitability of executing a relocation from one server 220 to another server 220-2. In one embodiment, this context data may be provided to the current server 220 from the application client 105 in response to relocation information provided to the application client 105 in the wireless device 303. The relocation information may indicate the plan or need for a server relocation, and may identify a point in time t1. With reference to FIG. 4, t1 is within a period 22 of high latency sensitivity.

In one embodiment, the application client 105 may thereby simply reply with an indication of unsuitability of relocation, to the current server 220. The server 220 may then issue new relocation information identifying a later point in time t2, which happens to be within a period 23 of low level of latency sensitivity. Responsive thereto, the client application 105 may respond with a high suitability indication, or otherwise indicate suitability by not responding at all.

In one embodiment, context data may include timing data associated with a level of latency sensitivity of the application session. In one embodiment, where the application session progression is substantially foreseeable, this context data may be provided for a longer frame of time, including one or more periods 22 of high latency sensitivity, and one or more periods 23 of low latency sensitivity, and timing information for such periods. In such an embodiment, the potential need for relocation may be planned and executed based on the obtained context data, preferably during a period 23 of low latency sensitivity. Such context data may be obtained from the application client 105 or from the application host 228.

In one embodiment, context data may be obtained including timing data identifying a time period 23 associated with low level latency sensitivity, e.g. responsive to the application client 105 receiving relocation information identifying a time point t1 during a period of high latency sensitivity 22. In an alternative embodiment, the context data may be obtained including timing data identifying a point in time t2 associated with low level latency sensitivity, e.g. a start of a period 23 of low latency sensitivity. In yet an alternative embodiment, the context data may be obtained including timing data identifying a time delay dt, identifying a suitable delay or postponement of relocation from a received point in time t1.

In one embodiment, the step of providing context data to the management entity 300 has the benefit of allowing the management entity 300 to effectively distribute users among different servers. This may be obtained by distributing users so that as many users as possible with sufficient latency are using the same ME application context (for example same level in a game) could be running from as few ME servers as possible. Without this proposal, the current way is to deploy/have static configuration to either distribute it to as many client as possible to ensure lowest latency or centralize too few data cluster in the cloud. With this proposal, it is possible for the management entity to dynamically decide, dependent on each user's context in the application, if the user should be relocated to another server due to mobility of the user.

In one embodiment, the method thus preferably comprises the step of providing context data to the management entity 300, such as the ME orchestrator 101, related to both a first wireless device running and a second wireless device running an application. Relocation of the session may then be executed dependent on a common latency requirement for said first and second wireless devices.

In one embodiment, relocating the session may be initiated dependent on determining that a resulting latency will not exceed a predetermined level.

Figure 5:
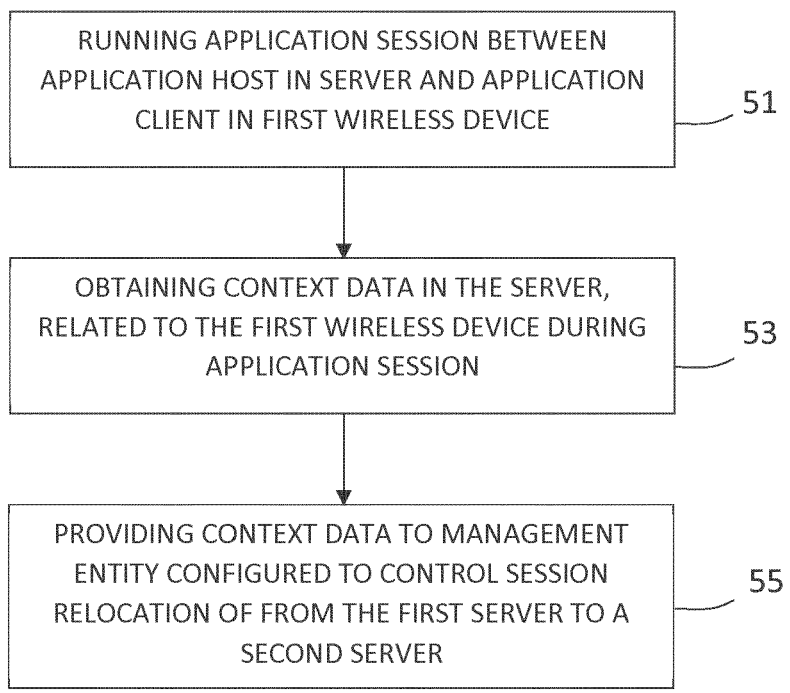
FIG. 5 illustrates a method according to one embodiment.

FIG. 5 illustrates, in broad terms, various steps of a method according to which various embodiments have been provided herein. This method relates to controlling relocation of a session of an application hosted in a first server 220 connected to a radio station 301 of a radio communications network, and comprises the steps of 51: running a session of the application between an application host 228 in said server 220 and an application client 105 in a first wireless device 303;

53: obtaining context data in the server, which context data is related to the first wireless device during said session;

55: providing said context data to a management entity 300 configured to control relocation of said session from the first server 220 to a second server 220-2.

Various embodiments have been provided herein, which may be combined in a multitude of ways, for controlling relocation of an application session in a MEC system. The scope is only limited by the claims.

REFERENCE NUMERALS FOR FIG. 1

100 Mobile edge system level
101 Mobile edge orchestrator
102 Operations Support System
103 User app LCM proxy
104 CFS portal
105 UE app
200 Mobile edge host level
201 Virtualisation infrastructure manager
210 Mobile edge platform manager
211 ME platform element mgmt
212 ME app rules & reqts mgmt
213 ME app lifecycle mgmt
220 Mobile edge server
221 Virtualisation infrastructure
222 Data plane
223 Mobile edge platform
224 Traffic rules control
225 DNS handling
226 Service registry
227 ME service
228 ME app
229 Service
220-2 Other ME server
223-2 Other ME platform

The invention claimed is:

1. A method for controlling relocation of a session of an application hosted in a first server connected to a radio station configured for communication with wireless devices, comprising:

running a session of the application between an application host in the first server and an application client in a first wireless device;

providing, to the first wireless device, relocation information indicating at least a need for relocating the session from the first server to a second sever;

obtaining context data in the first server from the first wireless device responsive to the relocation information, wherein the context data is related to a user context in the application during the session, and wherein the context data includes latency-sensitivity information including a time period when a latency sensitivity of the application is less than a threshold level;

providing the context data to a management entity configured to control relocation of the session from the first server to the second server; and relocating, by the management entity, the session from the first server to the second sever during the time period when the latency sensitivity of the application is less than the threshold level.

2. The method of claim 1, further comprising providing context data to the management entity related to a second wireless device running the application;

relocating the session dependent on a common latency requirement for the first and second wireless devices.

3. The method of claim 1, wherein the latency-sensitivity information includes a time period when the latency sensitivity of the application is greater than a threshold level.

4. The method of claim 1, wherein, responsive to the relocation information, the context data includes an indication of suitability of executing a relocation.

5. The method of claim 1, further comprising providing updated relocation information to the first wireless device in response to the context data.

6. The method of claim 1, wherein the relocation information identifies a point in time for relocating the session from the first server to the second sever.

7. The method of claim 6, wherein the context data indicates a suitability of the point in time for relocation that is indicated in the relocation information.

8. The method of claim 1, wherein the first server is a mobile edge (ME) server and the management entity includes a ME orchestrator, a ME platform or a ME platform manager.

9. A system for controlling relocation of a session of an application, the system comprising:

a management entity configured to control relocation of the session; and a server comprising an application host, which server is connectable to a radio station configured for communication with wireless devices, the server further comprising processing means, memory storage, and computer program code for execution by the processing means to:

run the session of the application between the application host and an application client in a first wireless device;

provide, to the first wireless device, relocation information indicating at least a need for relocating the session from the server to a second sever;

obtain, from the first wireless device in response to the relocation information, context data related to a user context in the application during the session, wherein the context data includes latency-sensitivity information including a time period when a latency sensitivity of the application is less than a threshold level; and provide the context data via an interface to the management entity; and wherein the management entity relocates the session from the server to the second sever during the time period when the latency sensitivity of the application is less than the threshold level.

10. The server of claim 9, comprising computer program code for execution by the processing means to provide context data to the management entity related to a second wireless device running the application;

relocate the session dependent on a common latency requirement for the first and second wireless devices.

11. The server of claim 9, further comprising computer program code for execution by the processing means to provide updated relocation information to the first wireless device in response to the context data.

12. The server of claim 9, wherein the relocation information identifies a point in time for relocating the session from the server to the second sever.

13. The server of claim 12, wherein the context data indicates a suitability of the point in time for relocation that is indicated in the relocation information.

* * * * *